United States Patent
Lu et al.

(10) Patent No.: US 9,781,755 B2
(45) Date of Patent: Oct. 3, 2017

(54) DEVICE TO-DEVICE RESOURCE PATTERN SIGNALING

(71) Applicant: Telefonaktiebolaget L M Ericsson (publ), Stockholm (SE)

(72) Inventors: Qianxi Lu, Beijing (CN); Zhenshan Zhao, Beijing (CN); Stefano Sorrentino, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 219 days.

(21) Appl. No.: 14/652,680

(22) PCT Filed: Apr. 28, 2015

(86) PCT No.: PCT/SE2015/050478
§ 371 (c)(1),
(2) Date: Jun. 16, 2015

(87) PCT Pub. No.: WO2015/171048
PCT Pub. Date: Nov. 12, 2015

(65) Prior Publication Data
US 2016/0219634 A1    Jul. 28, 2016

Related U.S. Application Data

(60) Provisional application No. 61/991,074, filed on May 9, 2014.

(51) Int. Cl.
*H04B 7/00* (2006.01)
*H04W 4/00* (2009.01)
(Continued)

(52) U.S. Cl.
CPC ..... *H04W 76/023* (2013.01); *H04W 72/0406* (2013.01); *H04W 72/0413* (2013.01);
(Continued)

(58) Field of Classification Search
CPC .......... H04W 76/023; H04W 72/0413; H04W 72/0453; H04W 74/0833; H04W 72/0446; H04W 72/0406; H04W 72/0493
See application file for complete search history.

(56) References Cited

U.S. PATENT DOCUMENTS

| | | | |
|---|---|---|---|
| 2013/0322413 A1 | 12/2013 | Pelletier et al. | |
| 2014/0177550 A1* | 6/2014 | Liao | H04W 28/18 370/329 |
| 2015/0334698 A1* | 11/2015 | Park | H04W 4/005 455/426.1 |

FOREIGN PATENT DOCUMENTS

WO    WO 2013/191519 A1    12/2013

OTHER PUBLICATIONS

Written Opinion of the International Searching Authority, Application No. PCT/SE2015/050478, dated Jul. 23, 2015.
(Continued)

Primary Examiner — Kiet Tang
(74) Attorney, Agent, or Firm — Sage Patent Group

(57) ABSTRACT

A first communication device is configured for device-to-device (D2D) communications with a second communication device. A method by the first communication device includes obtaining information on duplex configuration of a radio network node that may affect resource allocation by the first communication device for D2D communication with the second communication device. The method further includes deriving a set of resource patterns (RPTs) based on the information, selecting one RPT among the set of RPTs based on scheduler information, and signaling an index that is used to identify the selected RPT to the second communication device. Related methods by a communication device to derive resources to be used for D2D reception from another communication device based on a selected RPT are disclosed.

27 Claims, 6 Drawing Sheets

(51) Int. Cl.
H04W 76/02 (2009.01)
H04W 72/04 (2009.01)
H04W 74/08 (2009.01)

(52) U.S. Cl.
CPC ... *H04W 72/0446* (2013.01); *H04W 72/0453* (2013.01); *H04W 74/0833* (2013.01); *H04W 72/0493* (2013.01)

(56) References Cited

OTHER PUBLICATIONS

International Preliminary Report on Patentability, Application No. PCT/SE2015/050478, dated Jul. 27, 2016.
International Search Report, International Application No. PCT/SE2015/050478, dated Jul. 23, 2015; 4 pages.
Ericsson: "On Scheduling Assignments and Receiver Behaviour", 3GPP Draft; R1-141391 on Scheduling Assignments and Receiver Behaviour, 3rd Generation Partnership Project (3GPP), Mobile Competence Centre; 650, Route Des Lucioles; F-06921 Sophia-Antipolis Cedex; France; vol. RAN WG1, No. Shenzhen, China; Mar. 30, 2014, XP050787061, 6 pages; Retrieved from the Internet; URL:http://www.3gpp.org/ftp/Meetings_3GPP_SYNC/RAN1/Docs/.
Intel Corporation: "Discussion on D2D Synchronization Channel (PD2DSCH) "3GPP Draft; R1-141548 Intel—PD2DSCH, 3rd Generation Partnership Project (3GPP), Mobile Competence Centre; 650, Route Des Lucioles; F-06921 Sophia-Antipolis Cedex; France; vol. RAN WG1, No. Shenzhen, China; Mar. 30, 2014, XP050787216, 4 pages; Retrieved from the Internet; URL:http://www.3gpp.org/ftp/Meetings_3GPP_SYNC/RAN1/Docs/.
Ericsson: "On scheduling procedure for D2D", R1-140778, 3rd Generation Partnership Project (3GPP), Mobile Competence Centre; 650, Route Des Lucioles; F-06921 Sophia-Antipolis Cedex; France; 3GPP TSG-RAN WG1 Meeting #76; Prague, Czech Republic, Feb. 10-14, 2014, 5 pages; Retrieved from the Internet; URL:http://www.3gpp.org/DynaReport/TDocExMtg.htm.
Ericsson: "D2D Physical Channels Design", R1-141384, 3rd Generation Partnership Project (3GPP), Mobile Competence Centre; 650, Route Des Lucioles; F-06921 Sophia-Antipolis Cedex; France; 3GPP TSG-RAN WG1 Meeting #76bis; Shenzhen, China, Mar. 31-Apr. 4, 2014, 10 pages; Retrieved from the Internet; URL: http://www.3gpp.org/DynaReport/TDocExMtg--R1-76b--30649.htm.

* cited by examiner

Device-to-Device scenario

The physical broadcast channel carries both data and scheduling assignments (SAs).

DEVICE TO-DEVICE RESOURCE PATTERN SIGNALING

CROSS REFERENCE TO RELATED APPLICATION

This application is a 35 U.S.C. §371 national stage application of PCT International Application No. PCT/SE2015/050478, filed on 28 Apr. 2015, which itself claims priority to U.S. provisional Application No. 61/991,074, filed 9 May 2014, the disclosure and content of both of which is incorporated by reference herein in their entirety.

TECHNICAL FIELD

The present disclosure is directed to communications and, more particularly, to wireless communication methods, networks, and network nodes.

BACKGROUND

Recent developments of the 3GPP Long Term Evolution (LTE) facilitate accessing local IP based services in the home, office, public hot spot or even outdoor environments. One of the important use cases for the local IP access and local connectivity involves the direct communication between wireless communication devices, e.g., user equipment devices (UEs), in close proximity (typically less than a few 10s of meters, but sometimes up to a few hundred meters) of each other. For example, when communication devices (referred to as devices for brevity) are proximately located to each other, they may be configured to operate in a device-to-device (D2D) communication mode in which they communicate through a link directly between them without routing of communications through any other device or radio network node (e.g., eNB). FIG. 1 illustrates a system in which a pair of electronic communication devices 100 and 102 (also referred to as communication devices and devices for brevity) can operate in a D2D mode communicating through a link directly between them, or alternatively can operate to indirectly communicate with each other through a radio network node 110.

This direct mode or device-to-device (i.e. D2D) communications enables a number of potential improvements over the relay of communications through a radio network node (e.g., cellular network), because the pathway between D2D devices can be much shorter than between indirect communication devices (e.g., cellular devices) that communicate via radio network node (e.g., cellular base station, eNB). The advantages of D2D communications may include one or more of the following:

Capacity gain: Radio resources (e.g. OFDM resource blocks) between the D2D and cellular layers can be reused (providing reuse gain). Moreover, a D2D link uses a single hop between the transmitter and receiver devices as opposed to the 2-hop link via a cellular radio network node, e.g., access point (providing hop gain).

Peak rate gain: Due to the proximity and potentially favorable propagation conditions higher peak rates can be achieved (proximity gain); and Latency gain: When the devices communicate over a direct link, radio network node (e.g., eNB) forwarding is avoided and the end-to-end latency can decrease.

Some appealing applications of D2D communications are video streaming, online gaming, media downloading, peer-to-peer (P2P), file sharing, etc.

In RAN1#76 Chairman's notes, February 2014, the following processes have been disclosed for scheduling assignments (SAs). For D2D broadcast communication, scheduling assignments that at least indicate the location of the resource(s) for reception of the associated physical channel that carries D2D data are transmitted by the broadcasting device, which is also referred to as a user equipment (UE). The indication of resource(s) for reception may be implicit and/or explicit based on scheduling assignment resource or content. In other words, SAs are used for D2D broadcast communication to at least indicate time resources when the corresponding D2D data are transmitted. The SA benefits and the related procedures have been described in R1-140778 entitled "On scheduling procedure for D2D", Ericsson, February 2014.

Since SA is used to indicate the resource location to receiver devices, one aspect here is the resource pattern (RPT) design, i.e., location of subframes in which the D2D broadcast data transmissions will take place. The RPT design needs to consider the performance target, for example it is defined that the received power reference level should be larger than −107 dBm. To reach the −107 dBm power level, the following process may occur:

1) The occupied bandwidth is limited, to avoid collision in frequency domain.
2) The device (e.g., UE) hardware performance of in-band emission should be taken into account, to evaluate the adjacent-channel interference.
3) To compensate for bad channel quality (including high path loss, fading, co-channel interference, and/or adjacent channel interference), some L1 enhancement like re-transmission may be needed;
4) Re-transmission further increases the necessary resources for D2D transmission in time domain, which is more challenging for a TDD system where there are less UL sub-frames than a FDD system.

D2D can be transmitted in uplink (UL) resources (UL subframe in a Time Division Duplex (TDD) system and UL band in a Frequency Division Duplex (FDD) system). Because of half duplexing, the device (e.g., UE) cannot transmit and receive at the same time. Half duplexing is also a factor which should be considered in RPT design.

In R1-141384, entitled "D2D Physical Channels Design", Ericsson, April 2014, it has been proposed that the resource pattern design for a FDD system be as explained below and illustrated in FIG. 2, where the voice-over-IP (VoIP) traffic is considered. In FIG. 2 the y-axis (vertical axis) represents frequency domain and the x-axis (horizontal axis) represents time domain. UE-A (e.g., 100) transmits a scheduling assignment SA 200a on one frequency to UE-B (e.g., 102) and latter retransmits the scheduling assignment SA 200b on another frequency to UE-B to define a first data pattern at which voice packets 204 will be transmitted with hopping between two different frequencies. Similarly, UE-B (e.g., 102) transmits a scheduling assignment SA 202a to UE-A (e.g., 100) to define a second data pattern at which voice packets 206 will be transmitted with hopping between the two different frequencies.

In the example of FIG. 2, there is one voice packet created every 20 ms from an application layer, for which:

1) One SA pool is allocated, which allows one to four SA transmissions per 160 ms—SA cycle, i.e., to control the resource location for eight voice packets to be transmitted following the SA cycle;
2) Four data (re-)transmission per 20 ms are allocated, where 2RB bandwidth is allocated per data transmission; and 3) Between SA cycle and data transmission periods, i.e., during data transmission period, there are some subframes reserved for SA which are used for scheduling data packet in the following subframes.

Potential Problems with these Approaches:

Since the RPT design described in R1-141384 is for a FDD system and for VoIP traffic, it is hard to apply to a TDD system. For example, it requires at least 4 (for SA)+8*4 (for data)=36 for D2D broadcast transmission per 160 ms, which causes about 22.5% of resources to be allocated to D2D resources and may result in at least 22.5% UL throughput degradation of a cellular system. While for a TDD system, the available UL subframe number is between 10% (configuration 5) to 60% (configuration 0), which means in a TDD system, if reusing RPT processes from a FDD system, it would cause either larger UL performance degradation or result in not enough remaining resources even only for D2D broadcast communication.

One possible solution is to define many patterns, some optimized for FDD, some optimized for TDD, and all these different patterns are indicated via different indexes included in SA. However, SA payload must be minimized to provide an acceptable link budget, which is even more challenging in a TDD system with less UL subframes than a FDD system. Moreover for different traffic services the data pattern could be different because of different performance requirements.

Considering different traffic services and different TDD configuration scenarios, there could be a large number of data patterns. Then the number of pattern indexes would be too big and thus the pattern index length would be too large to be included in the limited SA payload.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a method by a first communication device for device-to-device (D2D) communications with a second communication device. The method includes obtaining information on duplex configuration of a radio network node that may affect resource allocation by the first communication device for D2D communication with the second communication device. The method further includes deriving a set of resource patterns (RPTs) based on the information, selecting one RPT among the set of RPTs based on scheduler information, and signaling an index that is used to identify the selected RPT to the second communication device.

A potential advantage of this approach is that a set of RPTs can be derived which are optimized in consideration of the duplex configuration of the radio network node that affects resource allocation by the first communication device for D2D communication with the second communication device. Moreover, use of available resources for overhead signaling is minimized by selecting one RPT from among the set of RPTs based on scheduler information and then only signaling an index to the second communication device which is used by the second communication device to identify the selected RPT. Improvements in communication resource capacity, peak traffic rates, and/or communication latency may be obtained for D2D communications between such communication devices.

In some further embodiments, the method includes deriving resources to be used for D2D transmission from the first communication device to the second communication device based on the selected RPT, and transmitting data from the first communication device to the second communication device using the resources derived for D2D transmission.

The information may be received from the radio network node when the first communication device is located within communication coverage of the radio network node, received from a Control Plane relay when the first communication device is located close to an edge of communication coverage of the radio network node, or received from a third communication device when the first communication device is located outside communication coverage of the radio network node.

The set of RPTs may be derived based on a FDD/TDD duplex scheme for a defined carrier indicated by the information, and the one RPT can be selected from among the set of RPTs based on whether the scheduler information is for a FDD duplex scheme or is for a TDD duplex scheme.

The set of RPTs may be derived based on any one or more of: PRACH configuration to avoid mapping data resources to resources that are used for PRACH, HARQ parameters to avoid resources used for uplink re-transmission by the radio network node, and PUCCH or SRS configuration to avoid mapping data resources to resources that are used for PUCCH or SRS, indicated by the information.

The set of RPTs may be derived based on any one or more of: periodicity, time offset, and/or resource allocation, indicated by the information. Alternatively or additionally, the set of RPTs may be derived based on a type of traffic to be D2D communicated to the second communication device.

Some other embodiments of the present disclosure are directed to a method by a first communication device for D2D communications with a second communication device. The method includes obtaining information on duplex configuration of a radio network node that may affect D2D resource use by the first communication device to receive D2D communications from the second communication device. The method further includes deriving a set of resource patterns (RPTs) based on the information, receiving an index signaled by the second communication device, selecting one RPT among the set of RPTs based on the index, and deriving resources to be used for D2D reception from the second communication device based on the selected RPT.

In some further embodiments, the method includes receiving data at the first communication device from the second communication device using the resources derived for D2D reception.

Related communication devices and radio network nodes are disclosed. Other methods, communication devices, and radio network nodes according to embodiments of the invention will be apparent to one with skill in the art upon review of the following drawings and detailed description. It is intended that all such additional methods, communication devices, and radio network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches.

Various embodiments are disclosed in the context of electronic communication devices (referred to as devices for brevity) that can communicate with each other using D2D and can communicate with a radio network node (e.g., eNB). Non-limiting example devices can include user equipment (UE), devices capable of machine to machine (M2M) communication, PDA, iPAD, tablet computer, mobile terminals, smart phone, laptop embedded equipped (LEE), laptop mounted equipment (LME), USB dongles etc.

Various embodiment disclosed herein are directed to operations and methods performed for device-to-device (D2D) transmission by a transmitting (Tx) device to a receiving (Rx) device. The transmitting and receiving devices use information about the carrier that will be used for the D2D transmission to derive a subset of resource patterns (RPTs) (e.g., data time patterns). Signaling of the data patterns from the transmitter device to the receiver device is then based on signaling one of the multiple patterns in the derived RPT subset.

In some embodiments, the SA includes a predefined (small) number of bits that indicate a RPT index. The potential receiver device (Rx) is made aware of the Frequency Division Duplex (FDD)/Time Division Duplex (TDD) and TDD configuration and possibly other relevant parameters. The subset of all possible RPTs signaled by the SA RPT bits can be a function of the FDD/TDD configuration based on a pre-defined mapping and/or other defined parameters. The other defined parameters may include Physical Random Access Channel (PRACH) positions, Hybrid ARQ, Hybrid Automatic Repeat Request (HARQ) parameters, and/or Physical Uplink Control Channel (PUCCH) or Sounding Reference Signal (SRS) configuration.

The RPT may explicitly indicate a pattern of only time resources, only frequency resources, or a combination of time and frequency resources. Other RPT properties may be derived at the receiver (Rx) device implicitly or blindly.

A potential advantage of this approach is that the SA overhead can be lower than otherwise while maintaining flexibility.

Figure 1:
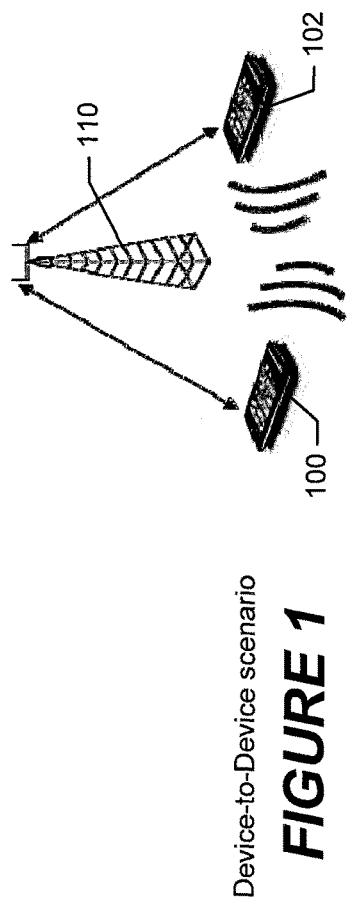
FIG. 1 illustrates a system in which devices can operate to communicate indirectly or directly with each other.
Figure 3:
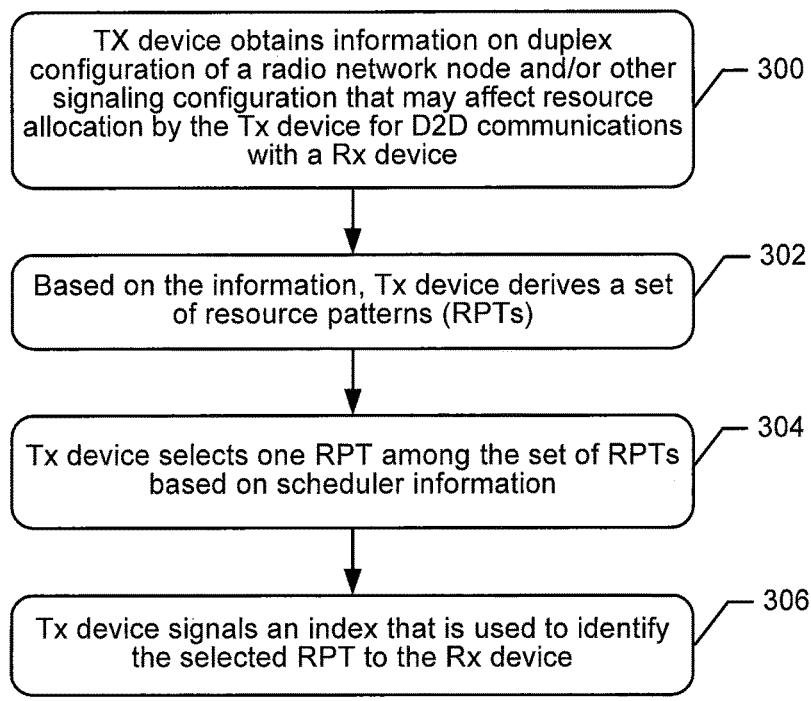
FIG. 3 illustrates a flowchart of operations and methods that are performed by a transmitter (Tx) device communicating by D2D with a receiver (Rx) device according to some embodiments.

FIG. 3 illustrates a flowchart of operations and methods that are performed by a transmitter (Tx) device (e.g., device 100 in FIG. 1) communicating with a receiver (Rx) device (e.g., device 102 in FIG. 1) according to some embodiments. Referring to block 300 of FIG. 3, before data transmission, the Tx device obtains information that indicates a duplex configuration of a radio network node (e.g., eNB 110 in FIG. 1) with which the Tx device can communicate, and/or obtains other signaling configuration that may affect resource allocation by the Tx device for D2D communications with a Rx device. The information may include one or more of: a FDD/TDD duplex scheme for a defined carrier, a TDD configuration, and/or other information that may affect the D2D resource allocation including, e.g. PRACH configuration, HARQ parameters, PUCCH/SRS configuration, periodicity, time offset, and/or resource allocation.

The Tx device may obtain the information by receiving it from the radio network node (when located within communication coverage of the radio network node), from a Control Plane (CP) relay (when located close to an edge of communication coverage of the radio network node), and/or from other devices, e.g., UEs such as a Cluster Head (CH) when located outside communication coverage of the radio network node. The Tx device may additionally or alternatively obtain the information based on pre-configured data stored within memory of the Tx device.

Referring to block 302, the Tx device uses the information (block 300) to derive a RPT and, more particularly, may derive a set of RPTs. Consequently, different information that is received or obtained can cause the Tx device to derive different sets of RPTs. Referring to block 304, the Tx device selects one RPT from among the set of RPTs that was derived (block 302) based on scheduler information.

Figure 2:
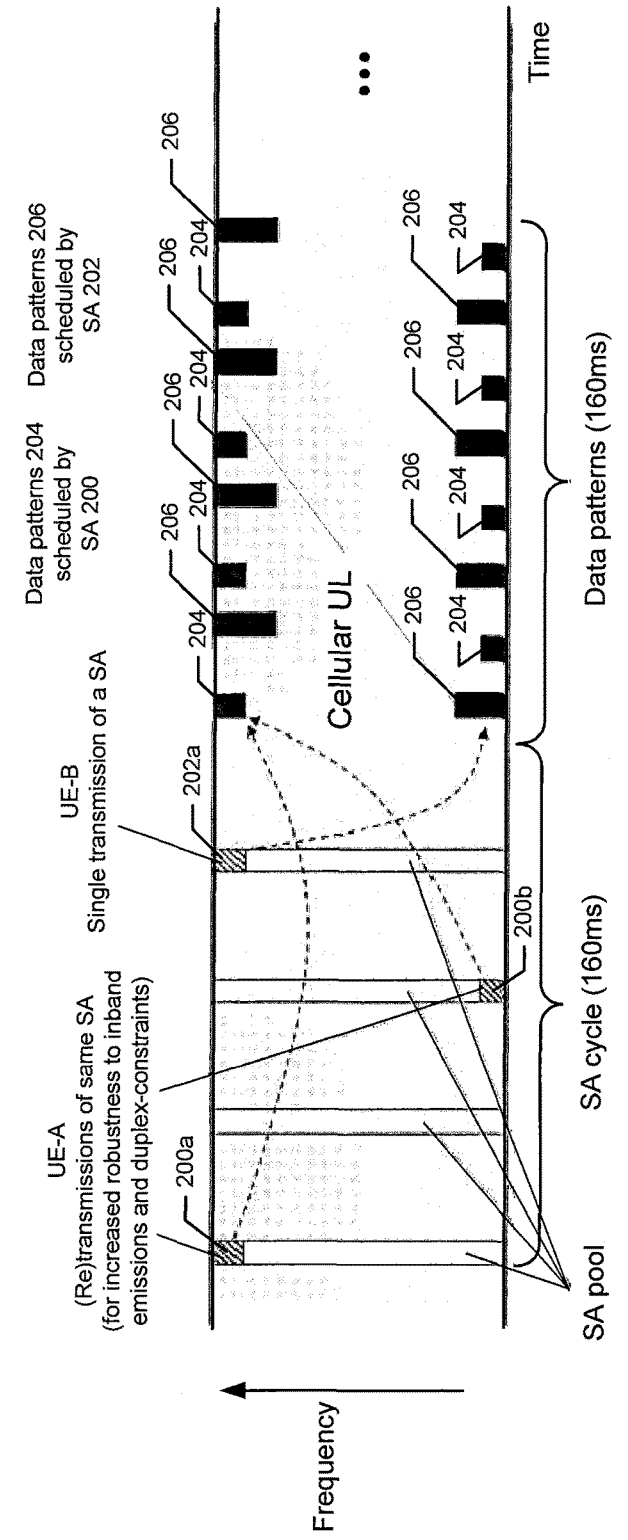
FIG. 2 illustrates a physical broadcast channel that carries both data and scheduling assignments (SA)

Five examples are provided below to illustrate how the Tx device can derive a set of RPTs using information that can include one or more of the following:

1) Duplex Information:

When the information includes duplex information such as FDD/TDD, and different TDD configuration, the RPT field in SA may have a different interpretation. An example RPT for a FDD system is illustrated in FIG. 2, while example RPTs for two TDD configurations ("TDD conf. 1" and "TDD conf. 2) are shown in FIG. 4.

Figure 4:
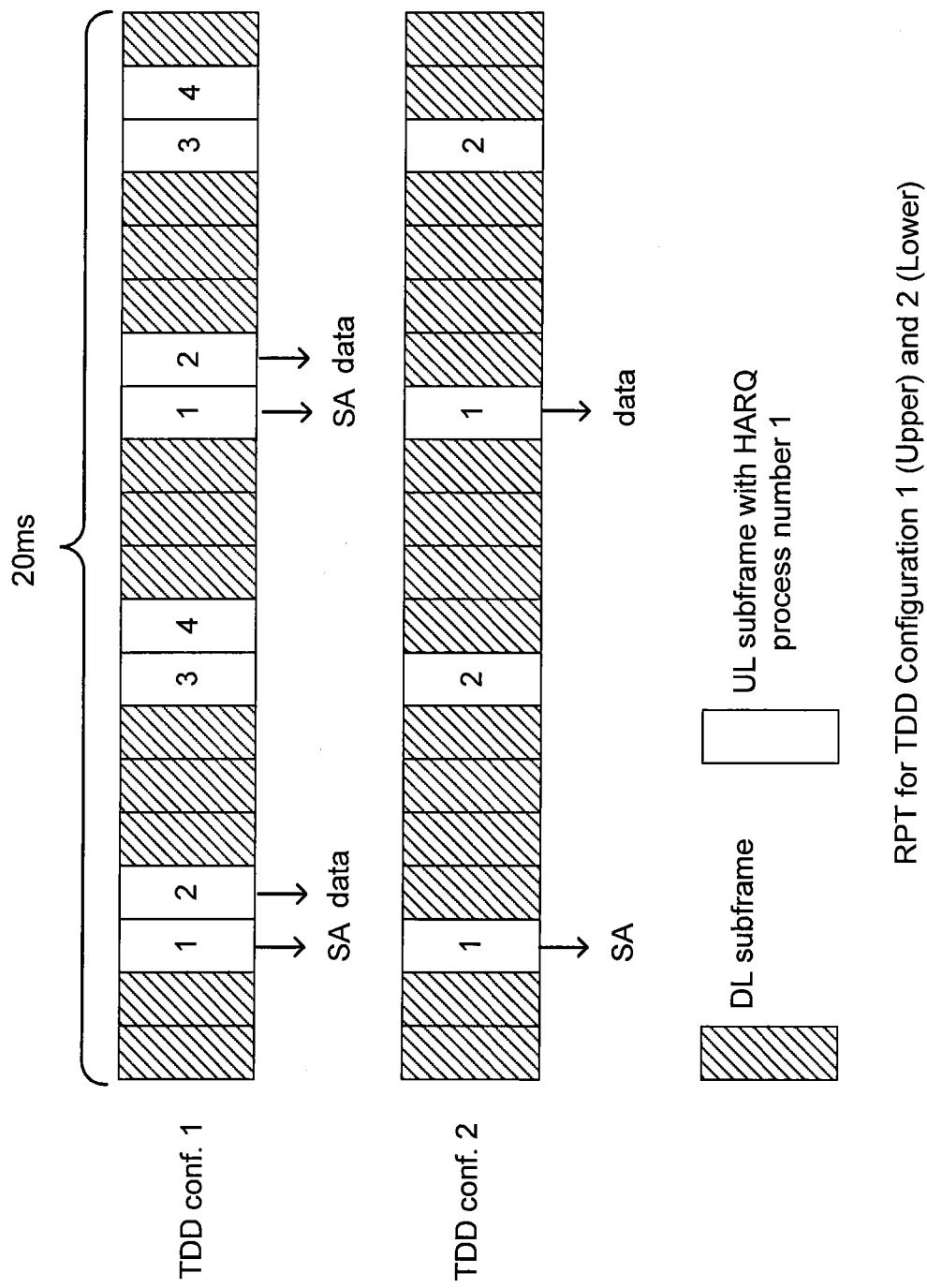
FIG. 4 illustrates resource patterns (RPTs) for two TDD configurations.

Referring to FIG. 4, it can be seen that the available UL subframe number is different between different configurations and the spacing between UL subframes is different, which imposes different constraints on the RPT pattern design for SA and data resources. Furthermore, compared to configuration 1, configuration 2 has less UL subframes (40%->20%), which causes less data subframes to be allocated to D2D data transmission (3 to 1 per 20 ms).

The Tx device can select (block 304) one RPT from among the set of RPTs that was derived, based on whether the scheduler information is for a FDD duplex scheme or is for a TDD duplex scheme.

2) PRACH Information:

When the information includes PRACH configuration, the set of RPTs can be derived so that the Tx device performs SA with the Rx device so that D2D communications avoid the PRACH resource of the radio network node (e.g., cellular node). PRACH and similar types of information can thereby affect the RPTs derived by the Tx device so that it avoids mapping the data resources to the resources that are used for PRACH. More particularly, the Tx device may derive the set of RPTs based on the PRACH configuration to avoid mapping data resources to resources that are used for PRACH.

3) HARQ Information:

When the information includes HARQ parameters, the device-to-device communications occurring as D2D and the communications by a radio network node (e.g., cellular node) multiplexes in their UL resources. UL HARQ (re) transmission by a cellular radio network node is synchronous. The Tx device can derive a set of RPTs based on the HARQ parameters for transmission of D2D data to avoid the resources used for uplink (UL) re-transmission by the radio network node (110).

4) PUCCH/SRS Information:

When the information includes PUCCH or SRS configuration, if D2D has to avoid the PUCCH or SRS resource of a radio network node (e.g., cellular node), this type of information can affect the RPT scheme, where one approach is to avoid mapping the data resources to the resources that are used for PUCCH or SRS. The Tx device may derive a set of RPTs for transmission of D2D data based on the PUCCH or SRS configuration to avoid mapping data resources to resources that are used for PUCCH or SRS.

5) Different Supported Traffic Types for D2D:

Different traffic types (e.g., VoIP, Multimedia, FTP, etc) are characterized by different throughput, latency, reliability and coverage constraints. One or more of these constraints can be obtained (known or determined) by the Tx device and used in-part to derive a set of RPTs. The traffic type may be determined and/or its constraints may be determined by the Tx device and used to control derivation of the RPTs' based on time resources density of data subframes in a pattern and mapping, retransmission patterns, HARQ retransmissions mapping, and/or parallel number of HARQ processes. For example, multimedia traffic has different throughput and data latency constraints than file transfer protocol (FTP) traffic. The Tx device can derive a different set of RPTs for multimedia traffic than for FTP traffic to provide, for example, a defined density of data subframes in a data pattern for the associated type of traffic that will be carried through the D2D communications.

It is noted that all possible RPTs for all supported sets of information scenarios may be tabulated in a table. Alternatively or additionally, the RPTs may be generated at run-time based on pre-defined rules.

A set of RPTs may be derived based on one or more of the following rules:

Provide a defined number of UL subframes or percentage of UL subframes to be used for D2D communications;

Provide a defined resource division between radio network node (e.g., cellular) communications and D2D communications;

Provide a defined number of SA and data subframes in a data pattern;

Provide a defined minimum subframe distance between SA and data;

Provide a minimum subframe distance between data re-transmission;

Avoid or prevent using an UL subframe that is used for PRACH/SRS; and/or

Considering HARQ information of radio network node (e.g., cellular) transmission.

Referring to block 306, the Tx device signals an index identifying the selected RPT to the Rx device. The Tx device may map the index to a field in the payload of SA (or equivalently any other D2D control channel). The same index value can be used to indicate a different selected RPT for, for example, the TDD configurations 1 and 2 shown in FIG. 4.

Figure 5:
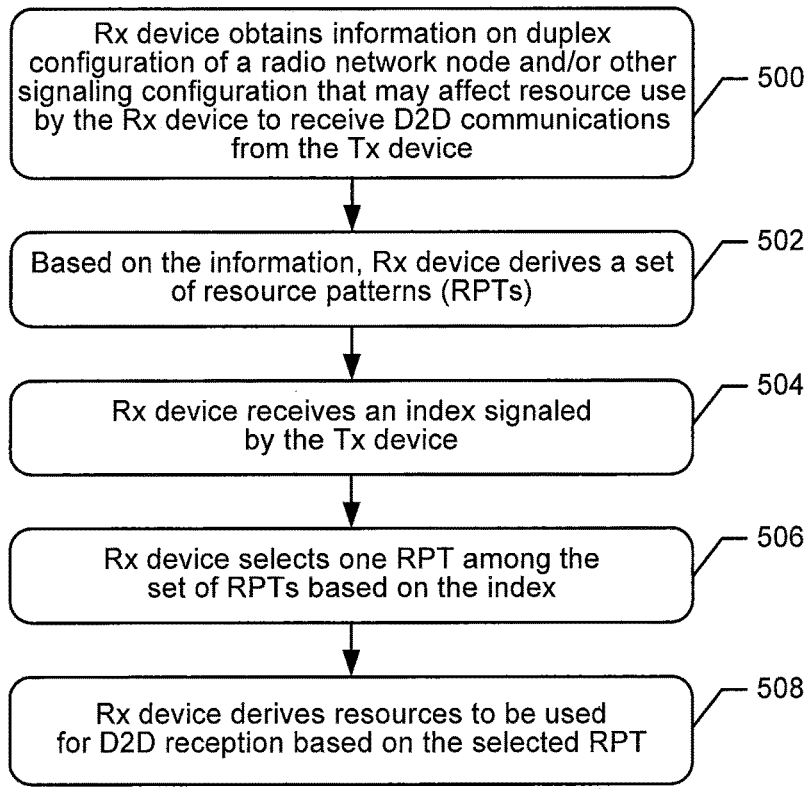
FIG. 5 illustrates a flowchart of operations and methods that are performed by a receiver (Rx) device receiving information from a transmitter (Tx) device by D2D communication according to some embodiments.

FIG. 5 illustrates a flowchart of operations and methods that are performed by a receiver (Rx) device receiving information from a Tx device using D2D communications according to some embodiments. In block 500, before data detection, the Rx device obtains information that indicates a duplex configuration of a radio network node (e.g., eNB 110 in FIG. 1) with which the Rx device can communicate and which may affect resource use by the Rx device to receive D2D communications from the Tx device, and/or obtains other signaling configuration which may affect resource use by the Rx device to receive D2D communications from the Tx device. The information may include one or more of: a FDD/TDD duplex scheme for a defined carrier, a TDD configuration, and/or other information that may affect the D2D resource allocation including, e.g. PRACH configuration, HARQ parameters, PUCCH/SRS configuration, periodicity, time offset, and/or resource allocation.

The Rx device may obtain the information by receiving it from the radio network node, e.g., eNB (when located within coverage of the radio network node), from a Control Plane (CP) relay (when located close to an edge of coverage of the radio network node), and/or from other devices, e.g., UEs such as a Cluster Head (CH) when located outside coverage of the radio network node. The Rx device may additionally or alternatively obtain the information based on pre-configured data stored within memory of the Rx device.

Referring to block 502, the Rx device uses the information (block 500) to derive a RPT and, more particularly, may derive a set of RPTs. Consequently, different information that is received or obtained can cause the Rx device to derive different sets of RPTs in a same or similar manner according to one or more operations described above by the Tx device in block 302, which is incorporated herein by reference for brevity.

Referring to block 504, the Rx device receives the index signaled by the Tx device, where the index is used to identify the RPT selected by the Tx device.

Referring to block 506, the Rx device selects one RPT from among the set of RPTs (derived in block 502) based on the index.

Referring to block 508, the Rx device derives resources to be used for D2D reception from the Tx device based on the selected RPT. The derived resources can identify the location of resources to be used by the Rx device for receiving data from the Tx device in the time domain, in the frequency domain, or in both the time domain and the frequency domain. When the information includes PRACH configuration, the Rx device may derive the set of RPTs based on the PRACH configuration to avoid mapping data resources to resources that are used for PRACH. When the information includes HARQ parameters, the Rx device may derive the set of RPTs based on the HARQ parameters to avoid the resources used for uplink (UL) re-transmission by the radio network node (110). When the information includes PUCCH or SRS configuration, the Rx device may derive the set of RPTs based on the PUCCH or SRS configuration to avoid mapping data resources to resources that are used for PUCCH or SRS.

Figure 7:
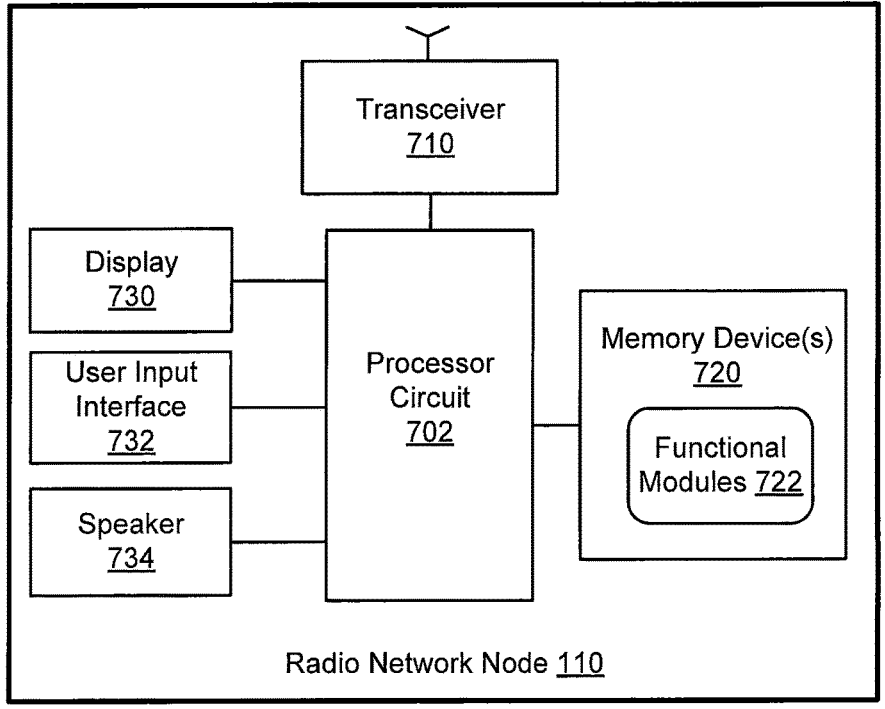
FIG. 7 is a block diagram of a radio network node configured according to some embodiments.

FIG. 7 illustrates a flowchart of further operations and methods that can performed by the Tx device according to some embodiments. In block 800, the Tx device derives resources to be used for D2D transmission to the Rx device based on the selected RPT (block 304 of FIG. 3). In block 802, the Tx device transmits data to the Rx device using the resources derived for D2D transmission.

Figure 8:
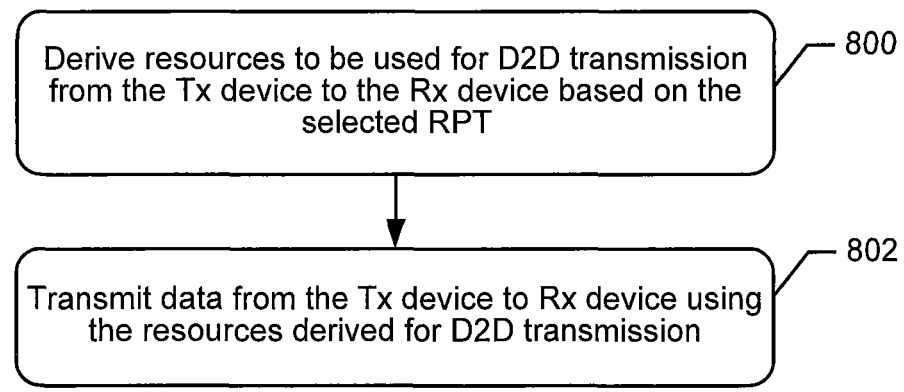
FIG. 8 is a flowchart of operations and methods performed by a transmitter (Tx) device for D2D transmission of data to a receiver (Rx) device, according to some embodiments.
Figure 9:
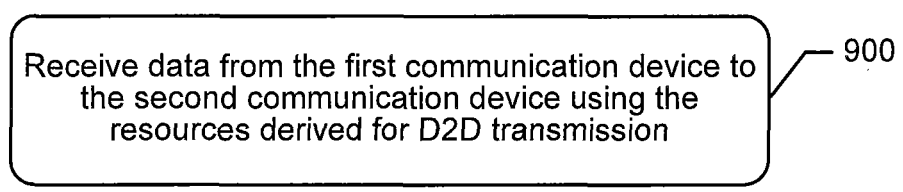
FIG. 9 is a flowchart of operations and methods performed by a receiver (Rx) device to receive data from a transmitter (Tx) device using resources deviced for D2D transmission.

FIG. 8 illustrates a flowchart of corresponding operations and methods that can performed by Rx device according to some embodiments. In block 900, the Rx device receives data from the Tx device using the resources derived (block 508 of FIG. 5) for D2D reception.

A potential advantage of these approaches is that a set of RPTs can be derived which are optimized in consideration of the duplex configuration of the radio network node 110 that affects resource allocation by the Tx device 100 for D2D communication with the Rx device 102. Moreover, use of available resources for overhead signaling is minimized by selecting one RPT from among the set of RPTs based on scheduler information and then only signaling an index from the Tx device 100 to the Rx device 102 which is used by the Rx device 102 to identify the selected RPT. Improvements in communication resource capacity, peak traffic rates, and/or communication latency may be obtained for D2D communications between such Tx and Rx devices 100, 102.

Example Communication Device and Radio Network Node

Figure 6:
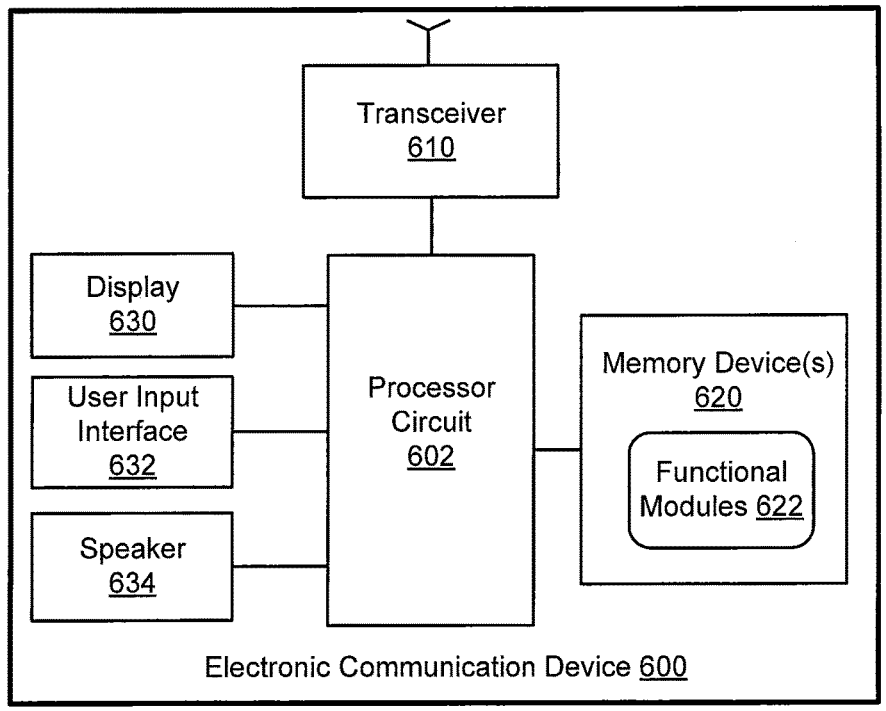
FIG. 6 is a block diagram of a communication device configured according to some embodiments.

FIG. 6 is a block diagram of an electronic communication device (device) 600 configured to communicate with another device using D2D and can communicate with a radio network node (e.g., eNB). The device 600 may be configured as the Tx device 100, the Rx device 102, and/or any other communication device (e.g., a radio network node) to perform operations and methods according to one or more embodiments disclosed herein. The device 600 includes a transceiver 610, a processor circuit(s) 602, and a memory device(s) 620 containing functional modules 622. The device 600 may further include a display 630, a user input interface 632, and a speaker 634.

The transceiver 610 is configured to communicate directly with another device using D2D and to communicate with a radio network node using one or more of the radio access technologies. The processor circuit 602 may include one or more data processing circuits, such as a general purpose and/or special purpose processor, e.g., microprocessor and/or digital signal processor. The processor circuit 602 is configured to execute computer program instructions from the functional modules 622 of the memory device(s) 620 to perform at least some of the operations described herein as being performed by a communication device.

FIG. 7 is a block diagram of a radio network node 110 (e.g., cellular base station, eNB) that includes a transceiver 710, a processor circuit(s) 702, and a memory device(s) 720 containing functional modules 722. The radio network node 110 may further include a display 730, a user input interface 732, and a speaker 734. The transceiver 710 is configured to communicate with the communication devices 100,102 using one or more of the radio access technologies. The processor circuit 702 may include one or more data processing circuits, such as a general purpose and/or special purpose processor, e.g., microprocessor and/or digital signal processor. The processor circuit 702 is configured to execute computer program instructions from the functional modules 722 of the memory device(s) 720 to perform at least some of the operations described herein as being performed by a radio network node.

Figure 10:
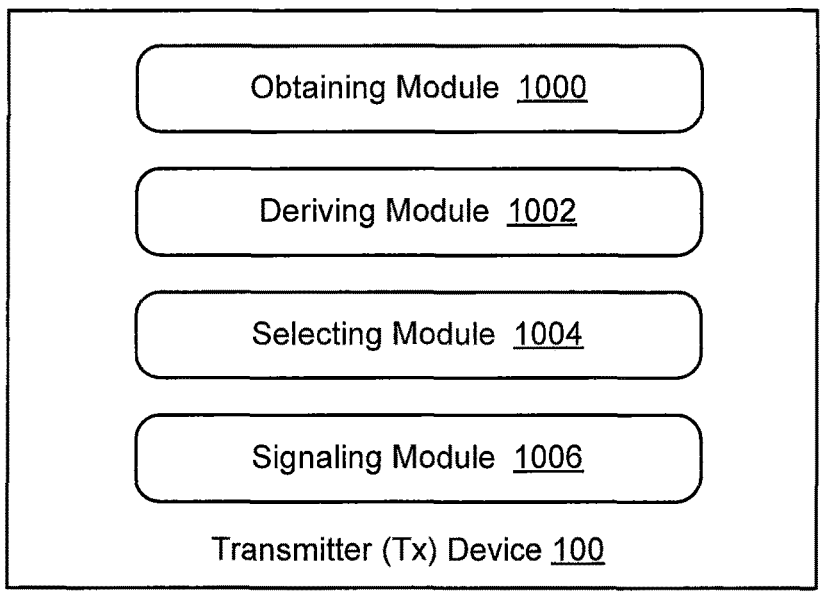
FIG. 10 is a block diagram of functional modules that may be implemented within a transmitter (Tx) device according to some embodiments.

FIG. 10 is a block diagram of functional modules that may be implemented within a Tx device 100 according to some embodiments. The modules include an obtaining module 1000 that operates and may perform the functional means as explained above for block 300, a deriving module 1002 that operates and may perform the functional means as explained above for block 302, a selecting module 1004 that operates and may perform the functional means as explained above for block 304, and a signaling module 1006 that operates and may perform the functional means as explained above for block 306. The modules 1000, 1002, 1004, and 1006 may be implemented by operation of computer software residing in the memory 620 being executed by the processor 602 of the communication device 600 configured as the Tx device 100. The modules 1000, 1002, 1004, and 1006 may alternatively be implemented in digital logic circuits and/or analog circuits within the Tx device 100.

Figure 11:
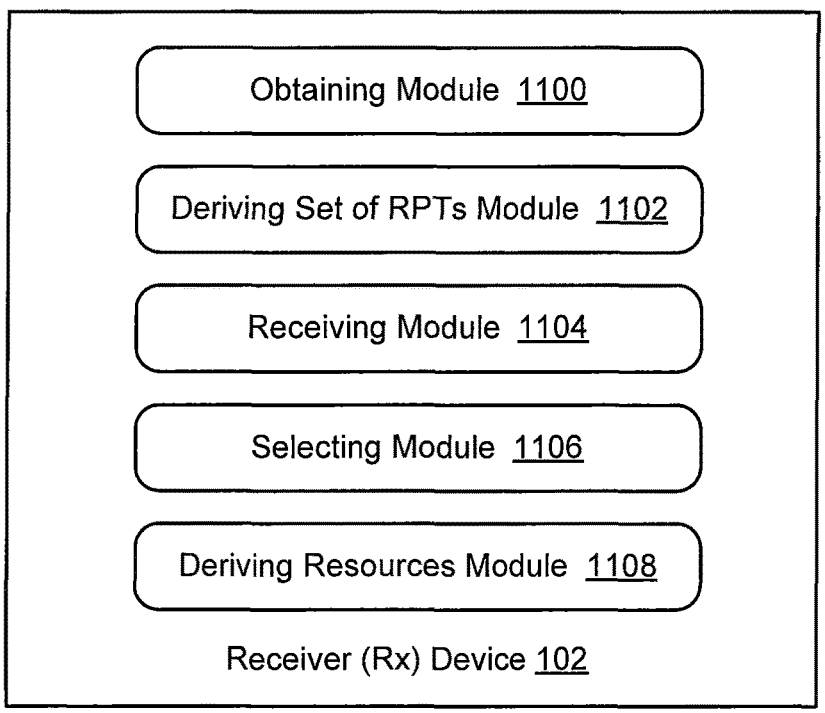
FIG. 11 is a block diagram of functional modules that may be implemented within a receiver (Rx) device according to some embodiments.

FIG. 11 is a block diagram of functional modules that may be implemented within a Rx device 102 according to some embodiments. The modules include an obtaining module 1100 that operates and may perform the functional means as explained above for block 500, a deriving set of RPTs module 1102 that operates and may perform the functional means as explained above for block 502, a receiving module 1104 that operates and may perform the functional means as explained above for block 504, a selecting module 1106 that operates and may perform the functional means as explained above for block 506, and a deriving resources module 1108 that operates and may perform the functional means as explained above for block 508. The modules 1100, 1102, 1104, 1106, and 1108 may be implemented by operation of computer software residing in the memory 620 being executed by the processor 602 of the communication device 600 configured as the Rx device 102. The modules 1100, 1102, 1104, 1106, and 1108 may alternatively be implemented in digital logic circuits and/or analog circuits within the Rx device 102.

ABBREVIATIONS

CH Cluster Head
CP Control Plane
D2D Device to Device
FDD Frequency Division Duplex
HARQ Hybrid Automatic Repeat request
HW Hardware
PRACH Physical Random Access Channel
PUCCH Physical Uplink Control Channel RPT Resource Pattern
RX receiver device
SA Scheduling Assignment
SRS Sounding Reference Signal
TDD Time Division Duplex
TX transmitter device
UE user equipment
UL Uplink

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a first communication device for device-to-device, D2D, communications with a second communication device, the method comprising:
   obtaining information on duplex configuration of a radio network node that may affect resource allocation by the first communication device for D2D communication with the second communication device;
   deriving a set of resource patterns, RPTs, based on the information;
   selecting one RPT among the set of RPTs based on scheduler information; and
   signaling an index that is used to identify the selected RPT to the second communication device.

2. The method of claim 1, further comprising:
   deriving resources to be used for D2D transmission from the first communication device to the second communication device based on the selected RPT; and
   transmitting data from the first communication device to the second communication device using the resources derived for D2D transmission.

3. The method of claim 1, wherein obtaining information on duplex configuration of a radio network node that may affect resource allocation by the first communication device for D2D communication with the second communication device, comprises:
   receiving the information from the radio network node when located within communication coverage of the radio network node.

4. The method of claim 1, wherein obtaining information on duplex configuration of a radio network node that may affect resource allocation by the first communication device for D2D communication with the second communication device, comprises:
   receiving the information from a Control Plane relay when located close to an edge of communication coverage of the radio network node or from a third communication device when located outside communication coverage of the radio network node.

5. The method of claim 1, wherein the set of RPTs is derived based on a Frequency Division Duplex (FDD) or a Time Division Duplex scheme for a defined carrier indicated by the information.

6. The method of claim 5, wherein the selecting one RPT among the set of RPTs based on scheduler information, comprises:
   selecting the one RPT among the set of RPTs based on whether the scheduler information is for a Frequency Division Duplex (FDD) scheme or is for a Time Division Duplex (TDD) scheme.

7. The method of claim 1, wherein the set of RPTs is derived based on a Time Division Duplex (TDD) configuration indicated by the information.

8. The method of claim 1, wherein the set of RPTs is derived based on any one or more of: Physical Random Access Channel (PRACH) configuration, Hybrid Automatic Repeat Request (HARQ) parameters, and Physical Uplink Control Channel (PUCCH) or Sounding Reference Signal (SRS) configuration, indicated by the information.

9. The method of claim 8, wherein the set of RPTs is derived based on the PRACH configuration to avoid mapping data resources to resources that are used for PRACH.

10. The method of claim 8, wherein the set of RPTs is derived based on the HARQ parameters to avoid resources used for uplink re-transmission by the radio network node.

11. The method of claim 8, wherein the set of RPTs is derived based on the PUCCH or SRS configuration to avoid mapping data resources to resources that are used for PUCCH or SRS.

12. The method of claim 1, wherein the set of RPTs is derived based on any one or more of: periodicity, time offset, and/or resource allocation, indicated by the information.

13. The method of claim 1, wherein the set of RPTs is derived based on a type of traffic to be D2D communicated to the second communication device.

14. The method of claim 13, wherein the set of RPTs is derived to provide a defined density of data subframes in a data pattern for an associated type of traffic that will be transmitted through the D2D communications to the second communication device.

15. A method by a first communication device for device-to-device, D2D, communications with a second communication device, the method comprising:
   obtaining information on duplex configuration of a radio network node that may affect D2D resource use by the first communication device to receive D2D communications from the second communication device;
   deriving a set of resource patterns, RPTs, based on the information;
   receiving an index signaled by the second communication device;
   selecting one RPT among the set of RPTs based on the index; and
   deriving resources to be used for D2D reception from the second communication device based on the selected RPT.

16. The method of claim 15, further comprising:
   receiving data at the first communication device from the second communication device using the resources derived for D2D reception.

17. The method of claim 15, wherein obtaining information on duplex configuration of a radio network node that may affect resource allocation by the first communication device for D2D communication with the second communication device, comprises:
   receiving the information from the radio network node when located within communication coverage of the radio network node.

18. The method of claim 15, wherein receiving the information from the radio network node, comprises:
   receiving the information from a Control Plane relay when located close to an edge of communication coverage of the radio network node or from a third communication device when located outside communication coverage of the radio network node.

19. The method of claim 15, wherein the set of RPTs is derived based on a Frequency Division Duplex (FDD) or a Time Division Duplex scheme for a defined carrier indicated by the information.

20. The method of claim 15, wherein the set of RPTs is derived based on a Time Division Duplex (TDD) configuration indicated by the information.

21. The method of claim 15, wherein the set of RPTs is derived based on any one or more of: Physical Random Access Channel (PRACH) configuration, Hybrid Automatic Repeat Request (HARQ) parameters, Physical Uplink Control Channel (PUCCH) and Sounding Reference Signal (SRS) configuration, periodicity, time offset, and/or resource allocation, indicated by the information.

22. The method of claim 21, wherein the set of RPTs is derived based on the PRACH configuration to avoid mapping data resources to resources that are used for PRACH.

23. The method of claim 21, wherein the set of RPTs is derived based on the HARQ parameters to avoid resources used for uplink re-transmission by the radio network node.

24. The method of claim 21, wherein the set of RPTs is derived based on the PUCCH or SRS configuration to avoid mapping data resources to resources that are used for PUCCH or SRS.

25. The method of claim 15, wherein the set of RPTs is derived based on any one or more of: periodicity, time offset, and/or resource allocation, indicated by the information.

26. The method of claim 15, wherein the set of RPTs is derived based on a type of traffic to be received by D2D communication from the second communication device.

27. The method of claim 26, wherein the set of RPTs is derived to provide a defined density of data subframes in a data pattern for an associated type of traffic that will be received through the D2D communications.

* * * * *